(12) United States Patent
Terleski et al.

(10) Patent No.: US 9,908,624 B2
(45) Date of Patent: Mar. 6, 2018

(54) PERSONAL ELECTRONIC DEVICE MOUNTING STRUCTURES

(71) Applicant: Zodiac Seats US LLC, Gainesville, TX (US)

(72) Inventors: Timothy W. Terleski, Richardson, TX (US); Alexander Gerard Saucier, Addison, TX (US)

(73) Assignee: Zodiac Seats US LLC, Gainsville, TX (US)

( * ) Notice: Subject to any disclaimer, the term of this patent is extended or adjusted under 35 U.S.C. 154(b) by 449 days.

(21) Appl. No.: 14/377,885

(22) PCT Filed: Feb. 20, 2013

(86) PCT No.: PCT/US2013/026890
§ 371 (c)(1),
(2) Date: Aug. 11, 2014

(87) PCT Pub. No.: WO2013/126421
PCT Pub. Date: Aug. 29, 2013

(65) Prior Publication Data
US 2015/0034687 A1 Feb. 5, 2015

Related U.S. Application Data

(60) Provisional application No. 61/600,862, filed on Feb. 20, 2012.

(51) Int. Cl.
*B60R 7/00* (2006.01)
*B64D 11/00* (2006.01)
(Continued)

(52) U.S. Cl.
CPC .......... *B64D 11/0015* (2013.01); *B60R 7/043* (2013.01); *B64D 11/06* (2013.01); *B64D 11/0624* (2014.12)

(58) Field of Classification Search
CPC ..... B60R 7/043; B60N 3/103; B64D 11/0015; B64D 11/0624; B64D 11/06
(Continued)

(56) References Cited

U.S. PATENT DOCUMENTS 5,529,265 A * 6/1996 Sakurai .................... A47C 7/72
244/118.5
6,793,109 B2 * 9/2004 Gates .................. A47B 81/005
211/64

(Continued)

FOREIGN PATENT DOCUMENTS

| WO | 2006052297 A2 | 5/2006 |
| WO | 2007109703 A2 | 9/2007 |

OTHER PUBLICATIONS

PCT/US2013/026890, International Preliminary Report on Patentability dated Sep. 4, 2014, 8 pages.
(Continued)

*Primary Examiner* — Adam Waggenspack
*Assistant Examiner* — Lester L Vanterpool
(74) *Attorney, Agent, or Firm* — Kilpatrick Townsend & Stockton LLP; Dean W. Russell; Anthony L. Guebert (57) ABSTRACT

Described are personal electronics device mounting structures including a base (12) with an aft surface, wherein the base is configured to fit substantially within a recess (42) so that the aft surface of the base (12) is substantially flush with an aft surface surrounding the recess (42) in a stowed position, and wherein at least a first portion of the base (12) is positioned aft of the recess and at least a second portion of the base (12) is positioned within the recess (42) in a deployed position, and a cradle (14) coupled to the base, wherein the cradle (14) comprises a pair of arms (22)
(Continued)

configured to hold a personal electronics device securely in place adjacent a passenger seat back when the base (12) is in the deployed position.

20 Claims, 12 Drawing Sheets

(51) Int. Cl.
    *B64D 11/06*     (2006.01)
    *B60R 7/04*     (2006.01)

(58) Field of Classification Search
    USPC ........................................ 224/275; 297/217.3
    See application file for complete search history.

(56) References Cited

U.S. PATENT DOCUMENTS

| | | | | |
|---|---|---|---|---|
| 6,994,239 B2* | 2/2006 | Vaidyanathan | ........ | B65H 23/26 226/97.3 |
| 7,036,879 B2* | 5/2006 | Chang | ................ | B60R 11/0235 297/217.3 |
| 7,591,508 B2* | 9/2009 | Chang | ................ | B60R 11/0235 297/217.3 |
| 7,719,830 B2* | 5/2010 | Howarth | ............... | G06F 1/1632 312/223.2 |
| 7,762,627 B2* | 7/2010 | Chang | ................. | B60R 11/0235 297/217.1 |
| 8,403,411 B2* | 3/2013 | Boyer, Jr. | .............. | B64D 11/06 297/217.3 |
| 8,585,140 B2* | 11/2013 | Chang | ................. | B60R 11/0235 297/217.3 |
| 8,740,301 B2* | 6/2014 | Liu | ...................... | B60N 2/4876 297/217.1 |
| 2004/0227861 A1* | 11/2004 | Schedivy | ............. | B60N 2/4876 348/837 |
| 2007/0096517 A1* | 5/2007 | Chang | ................. | B60R 11/0235 297/217.3 |
| 2007/0222248 A1* | 9/2007 | Maulden | .............. | B60N 2/4876 296/37.15 |
| 2010/0007805 A1* | 1/2010 | Vitito | ..................... | B60K 35/00 348/837 |
| 2014/0209648 A1* | 7/2014 | Jahn | ........................ | B60R 11/02 224/401 |

OTHER PUBLICATIONS

PCT/US2013/026890, Search Report and Written Opinion dated May 24, 2013, 12 pages.

\* cited by examiner

PERSONAL ELECTRONIC DEVICE MOUNTING STRUCTURES

CROSS REFERENCE TO RELATED APPLICATIONS

This application is the U.S. national phase of International Application No. PCT/US2013/026890, filed on Feb. 20, 2013, entitled PERSONAL ELECTRONIC DEVICE MOUNTING STRUCTURES ("the '890 application") which is related to and claims priority benefits from U.S. Provisional Application Ser. No. 61/600,862, filed on Feb. 20, 2012, entitled TABLET SEAT BACK MOUNT INTEGRATIONS ("the '862 application"). The contents of both the '862 and '890 applications are hereby incorporated herein in their entirety by this reference.

FIELD OF THE INVENTION

The invention relates to personal electronics device mounting structures for use with passenger seats or the like.

BACKGROUND

In many instances, passenger vehicles, such as aircraft, buses, trains, ships, and automobiles, include passenger seats with a wide assortment of personal electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and arm rests of the passenger seats.

With the advent of personal electronics devices ("PEDs"), such as tablet computers, cell phones, smart phones, handheld video game systems, personal digital assistants, palmtop computers, DVD players, data and audio-video media, multi-media enabled devices, and other similar electronic devices, many passengers prefer to use their own PEDs, rather than the OBE or IFE components that are mounted in the passenger seats.

In some cases, it may be desirable to provide a way for passengers to mount their own PEDs for hands-free viewing and use and/or to connect their PEDs to the OBE or IFE systems, so that they may use their own PEDs in lieu of the OBE or IFE components.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention may comprise a personal electronics device mounting structure comprising a base comprising an aft surface, wherein the base is configured to fit substantially within a recess so that the aft surface of the base is substantially flush with an aft surface surrounding the recess in a stowed position, and wherein at least a first portion of the base is positioned aft of the recess and at least a second portion of the base is positioned within the recess in a deployed position, and a cradle coupled to the base, wherein the cradle comprises a pair of arms configured to hold a personal electronics device securely in place adjacent a passenger seat back when the base is in the deployed position.

According to certain embodiments, the personal electronics device mounting structure may further comprise a connection port connected to at least one of a power supply, an on-board entertainment system, and an in-flight entertainment system.

According to other embodiments, the pair of arms may be coupled to a lower surface of the cradle, and padding coupled to an interior surface of each of the pair of arms comprising a shape that is configured to apply pressure to a portion of the personal electronics device inserted within the cradle. The padding may be configured to form a space having trapezoidal side profile or a downwardly pointing arrow side profile within the cradle.

In certain embodiments, the personal electronics device mounting structure may be configured to provide the personal electronics device with up to approximately 15 degrees of rotation. For example, the cradle may be pivotally coupled to the base so that the cradle may be rotated up to approximately 15 degrees relative to the base. In other embodiments, the recess may be located in a monitor bezel pivotally coupled to the passenger seat back, wherein the monitor bezel may be rotated up to approximately 15 degrees relative to the passenger seat back.

In these embodiments, the personal electronics device is a tablet computer, a cell phone, a smart phone, a handheld video game system, a personal digital assistant, a palmtop computer, a DVD player, data or audio-video media, or a multi-media enabled device.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide PED mounting structures for use with a passenger seat. While the PED mounting structures are discussed for use with aircraft passenger seats, they are by no means so limited. Rather, embodiments of the PED mounting structures may be used for other seats of any type or otherwise as desired.

FIGS. 1-12 illustrate embodiments of a PED mounting structure 10. In these embodiments, the PED mounting structure 10 comprises a base 12 and a cradle 14. The base 12 and the cradle 14 may be formed of materials including but not limited to plastics, aluminum, stainless steel, other metallic materials, composite materials, or other suitable materials.

In certain embodiments, as shown in FIGS. 1-12, the base 12 is configured to stow within a recess 42 when not in use. In these embodiments, the base 12 may stow so that an aft surface 18 of the base 12 is substantially flush with an aft surface surrounding the recess 42. To access the base 12, one or more access points 20 may be positioned on the base 12 and/or adjacent the recess 42 so that a user is able to grip the base 12 and pull the base 12 from the stowed position within the recess 42. One of ordinary skill in the relevant art will understand that suitable access points 20 include but are not limited to one or more ledges, tabs, notches, handles, or other access points. The base 12 may be slidingly coupled to the recess 42 so that the base 12 may be pulled to a deployed position where at least a first portion of the base 12 is positioned aft of the recess 42, while at least a second portion of the base 12 remains positioned within the recess 42 to provide stability to the base 12 in the deployed position.

The cradle 14 comprises a pair of arms 22 extending upwardly from a lower surface 24, wherein the arms 22 may be spaced apart a distance that approximates a thickness of a PED 26. Examples of suitable PEDs 26 include but are not limited to a tablet computer, cell phone, smart phone, handheld video game system, personal digital assistant, palmtop computer, DVD player, data and/or audio-video media, multi-media enabled device, and other similar electronic devices.

In some embodiments, the arms 22 may be spring-loaded and positioned at a distance from one another so that the arms 22 are at least slightly spread apart by the insertion of a portion of the PED 26, wherein the spring-loaded design of the arms 22 is configured to accommodate PEDs 26 having a range of thicknesses. The force applied to the arms 22 by the position of the PED 26 causes the spring-loaded design of the arms 22 to apply pressure to the portion of the PED 26 inserted within the cradle 14 to hold the PED 26 in place.

In other embodiments, the arms 22 positioned at a distance from one another and may be rigidly and/or integrally coupled to the lower surface 24 so that the arms 22 do not move when a portion of the PED 26 is inserted into the cradle 14. In these embodiments, the arms 22 may be positioned at approximately the same distance as the thickness of a PED 26 or at a distance wider than the thickness of a PED 26, wherein padding 30, described in more detail below, may be used within the cradle 14 to hold PEDs 26 having a range of thicknesses securely in place within the cradle 14.

In yet other embodiments, a first arm 22 may be rigidly and/or integrally coupled to the lower surface 24 so that the first arm 22 does not move when a PED 26 is inserted into the cradle 14. A second arm 22 may be slidingly coupled to the base 12 and/or lower surface 24 so that the second arm 22 may be adjusted to the appropriate width from the first arm 22 to hold the PED 26 securely in place, while also allowing the cradle 14 to hold PEDs 26 having a range of thicknesses securely in place within the cradle 14.

As best shown in FIGS. 3, 7, and 11-12, an interior surface 28 of each the arms 22 may be lined with padding 30 that at least partially compresses when the PED 26 is inserted into the cradle 14. As a result, the compressible design of the padding 30 applies pressure to the portion of the PED 26 inserted within the cradle 14 to hold the PED 26 in place and allows the cradle 14 to accommodate PEDs 26 having a range of thicknesses. The padding 30 also protects the PEDs 26 from damage from the pressure applied by the arms 22, particularly in the spring-loaded embodiments. Suitable materials used to form the padding 30 include rubber, vinyl, neoprene, nitrile, silicone, elastomers, elastic materials, other polymers, or other materials that undergo elastic deformation and return to original shape without permanent deformation.

Figure 11:
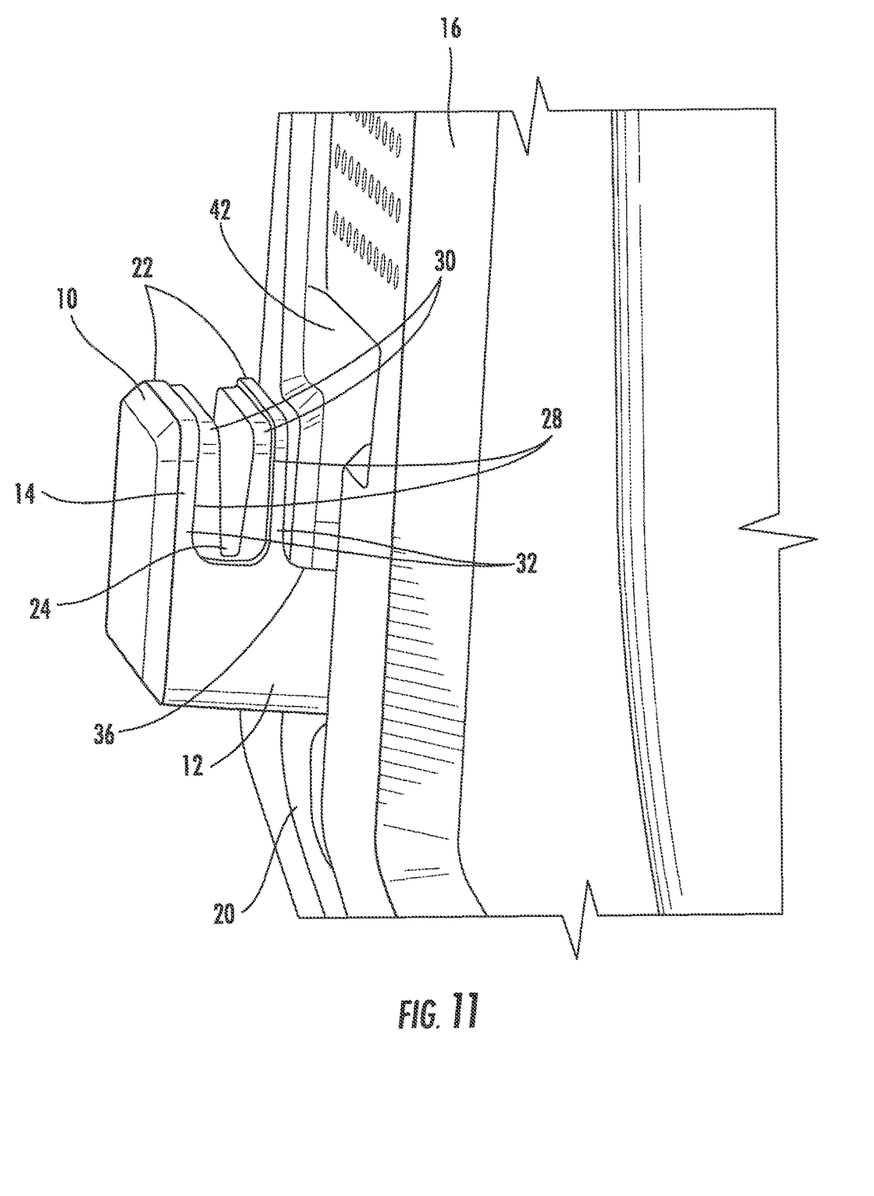
FIG. 11 is a partial perspective view of the personal electronics device mounting structure of FIG. 9 with the base in a deployed position and padding forming a space having a trapezoidal side profile within a cradle.

The padding 30 may have a shape that substantially corresponds to the general shape of an interior space of the cradle 14. In some embodiments, the padding 30 may comprise a shape that further assists with holding the PED 26 in place within the cradle 14 so that the padding 30 forms a grip 30. For example, as shown in FIG. 11, the padding 30 is configured to form a space having trapezoidal side profile within the cradle 14, meaning that from a side view of the cradle 14, the spacing between the padding 30 along each arm 22 forms a space having a trapezoidal shape with the larger opening located at an upper end of the arms 22. With the trapezoidal padding design, the pressure applied to the portion of the PED 26 inserted within the cradle 14 gradually decreases from the lower surface 24 to an upper edge of the arms 22.

Figure 12:
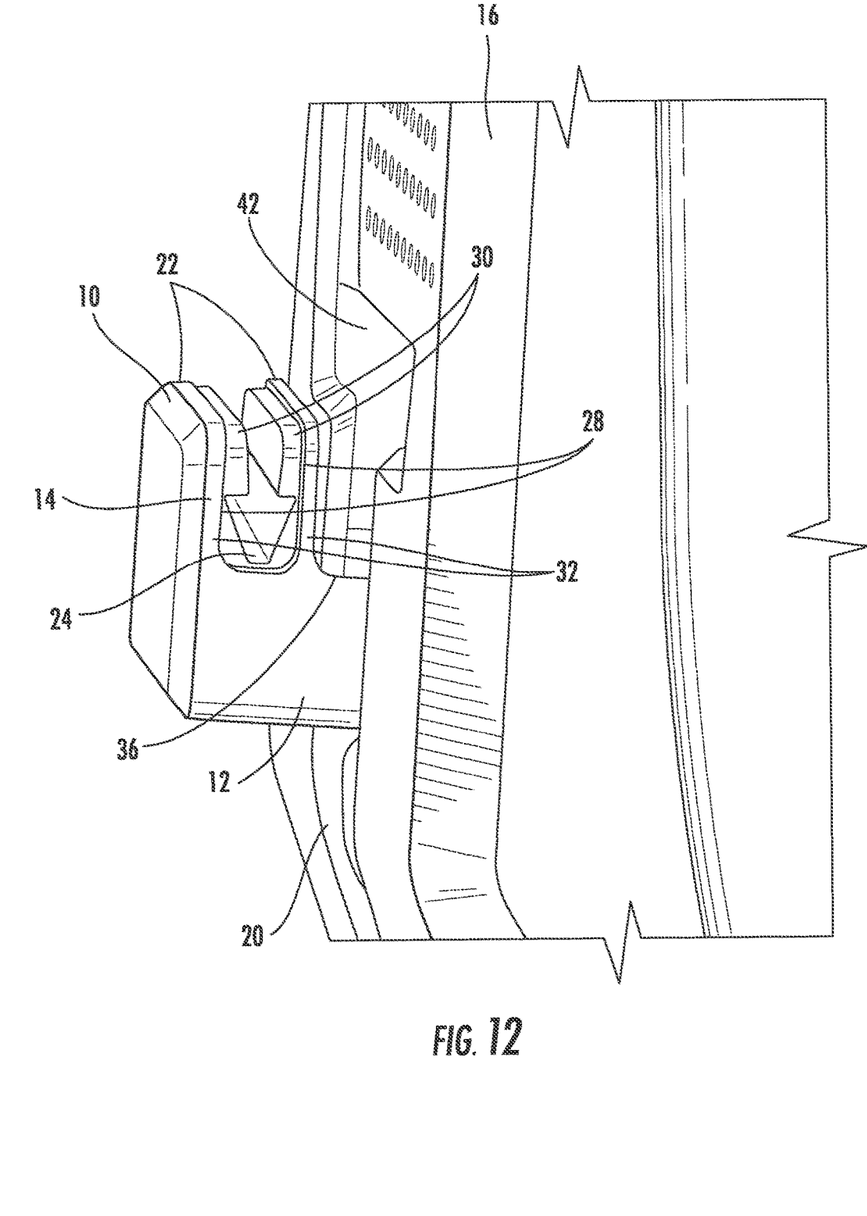
FIG. 12 is a partial perspective view of the personal electronics device mounting structure of FIG. 9 with the base in a deployed position and padding forming a space having a downwardly pointing arrow side profile within a cradle.

In other embodiments, as shown in FIG. 12, the padding 30 is configured to form a space having a downwardly pointing arrow side profile within the cradle 14, meaning that from a side view of the cradle 14, the spacing between the padding 30 along each arm 22 forms a space having a shape of a downward pointing arrowhead. In these embodiments, the pressure applied to the portion of the PED 26 inserted within the cradle 14 gradually decreases from the lower surface 24 to the base of the arrowhead (located approximately at a midpoint of the arms 22). The pressure applied to the portion of the PED 26 inserted within the cradle 14 undergoes a step-increase at the point of transition between the base of the arrowhead and the beginning of the arrow shaft. Finally, the pressure applied to the portion of the PED 26 inserted within the cradle 14 is then uniformly applied along the shaft of the arrow to the upper edge of the arms 22.

Figure 1:
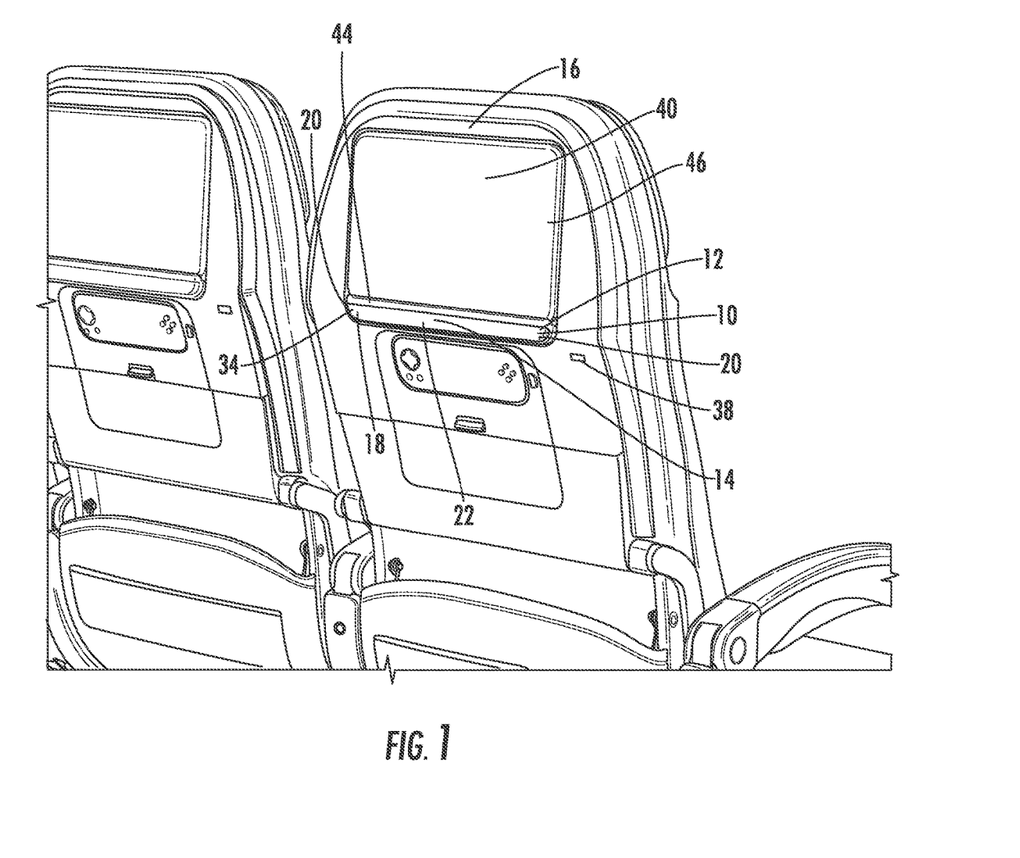
FIG. 1 is a perspective view of a personal electronics device mounting structure with a base in a stowed position and incorporated into a monitor bezel of a passenger seat back, according to certain embodiments of the present invention.
Figure 2:
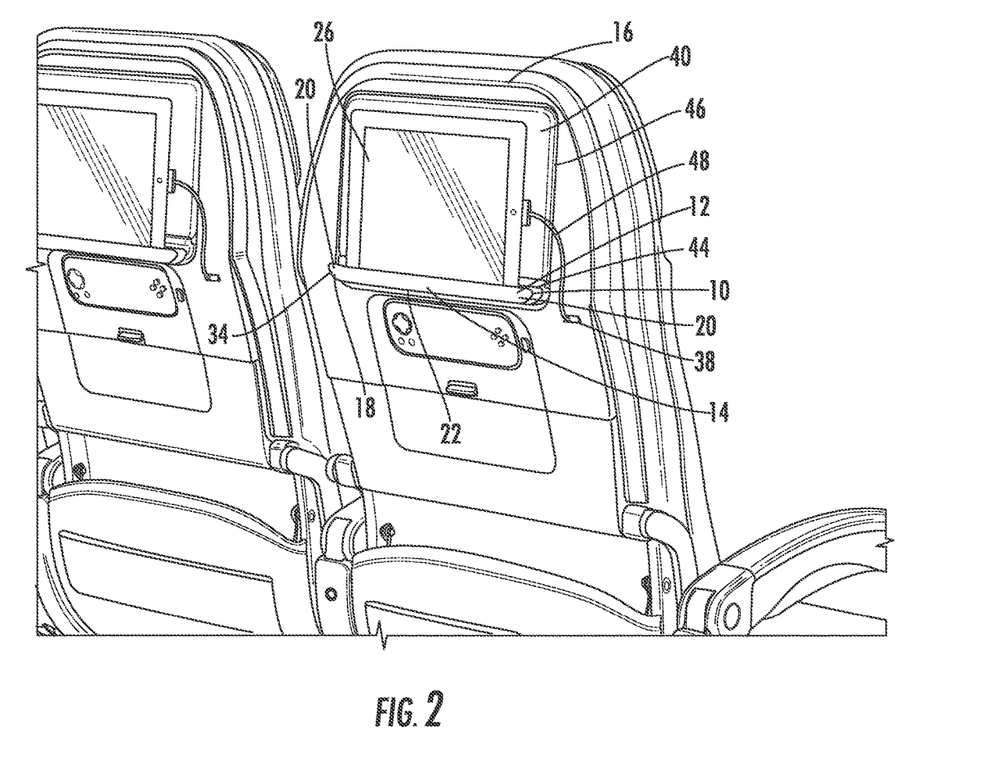
FIG. 2 is a perspective view of the personal electronics device mounting structure of FIG. 1 with the base in a deployed position and in use with a personal electronics device mounted in a landscape orientation.
Figure 3:
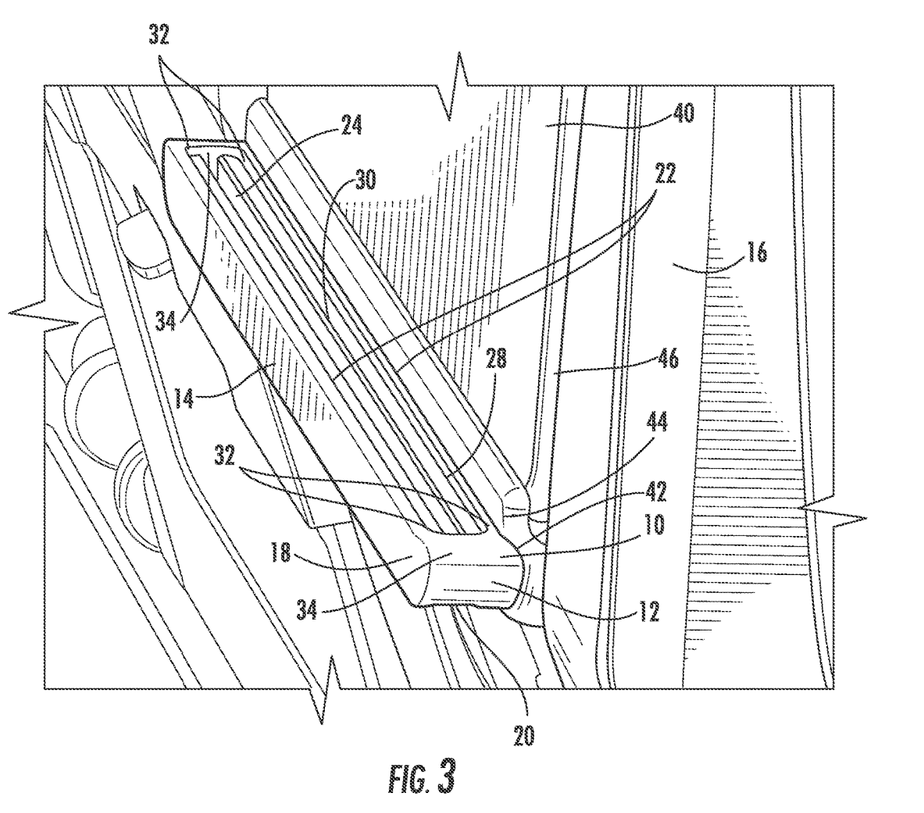
FIG. 3 is a partial perspective view of the personal electronics device mounting structure of FIG. 1 with the base in a deployed position.
Figure 5:
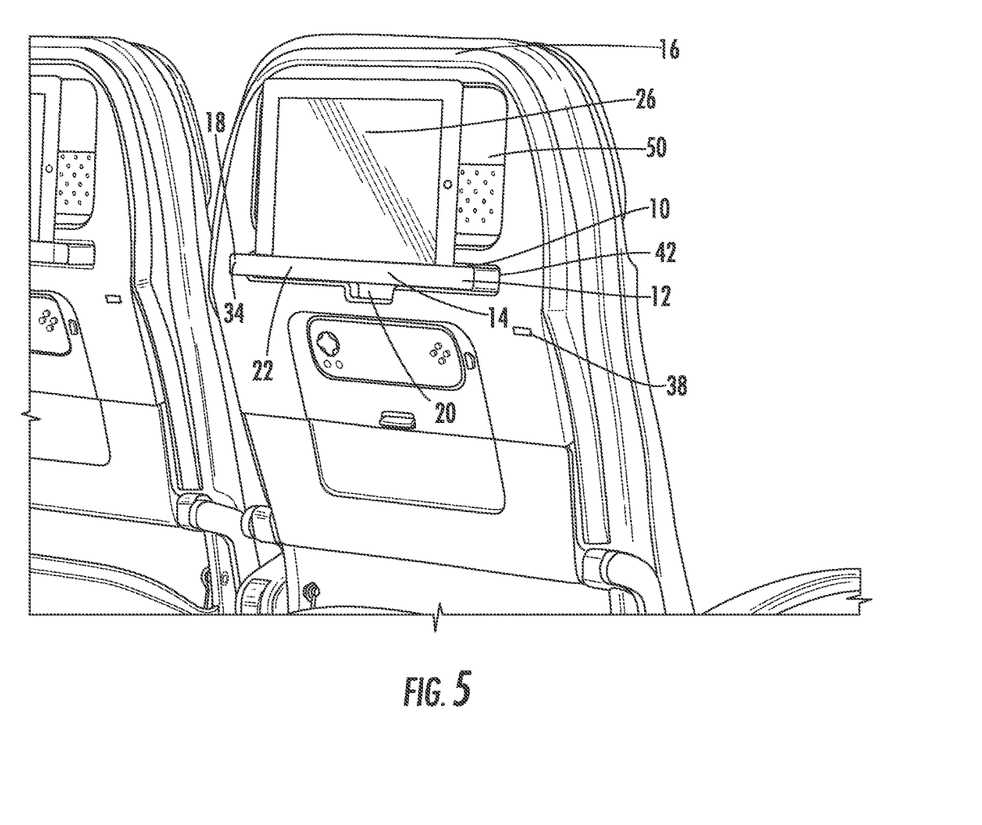
FIG. 5 is a perspective view of the personal electronics device mounting structure of FIG. 4 with the base in a deployed position, a cradle in an upright position, and in use with a personal electronics device mounted in a landscape orientation.
Figure 6:
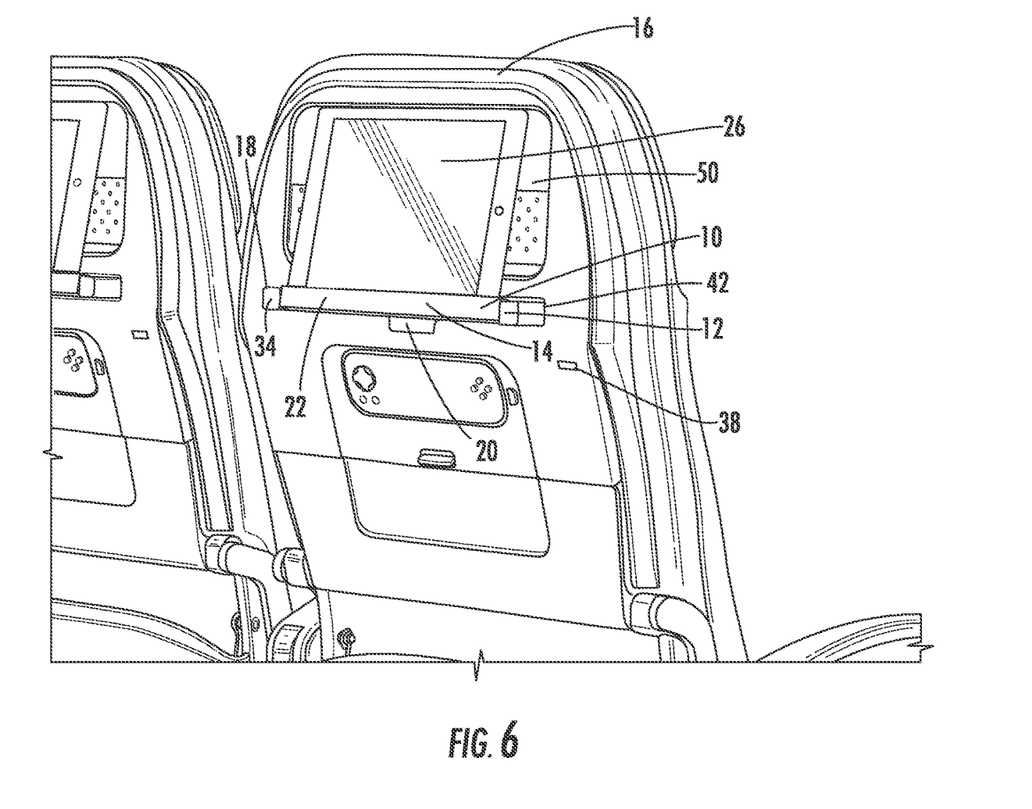
FIG. 6 is a perspective view of the personal electronics device mounting structure of FIG. 4 with the base in a deployed position, a cradle in a fully rotated position, and in use with a personal electronics device mounted in a landscape orientation.
Figure 7:
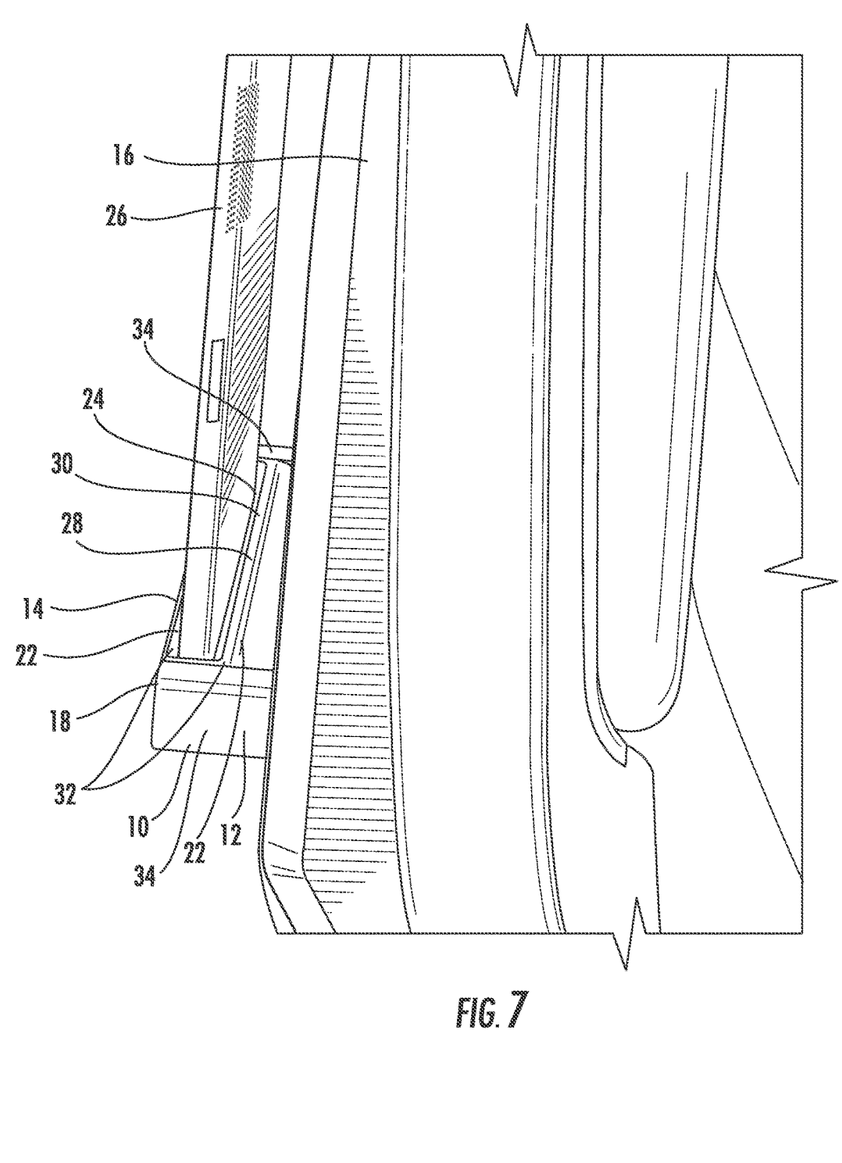
FIG. 7 is a partial perspective view of the personal electronics device mounting structure of FIG. 4 with the base in a deployed position, a cradle in an upright position, and in use with a personal electronics device mounted in a landscape orientation.
Figure 8:
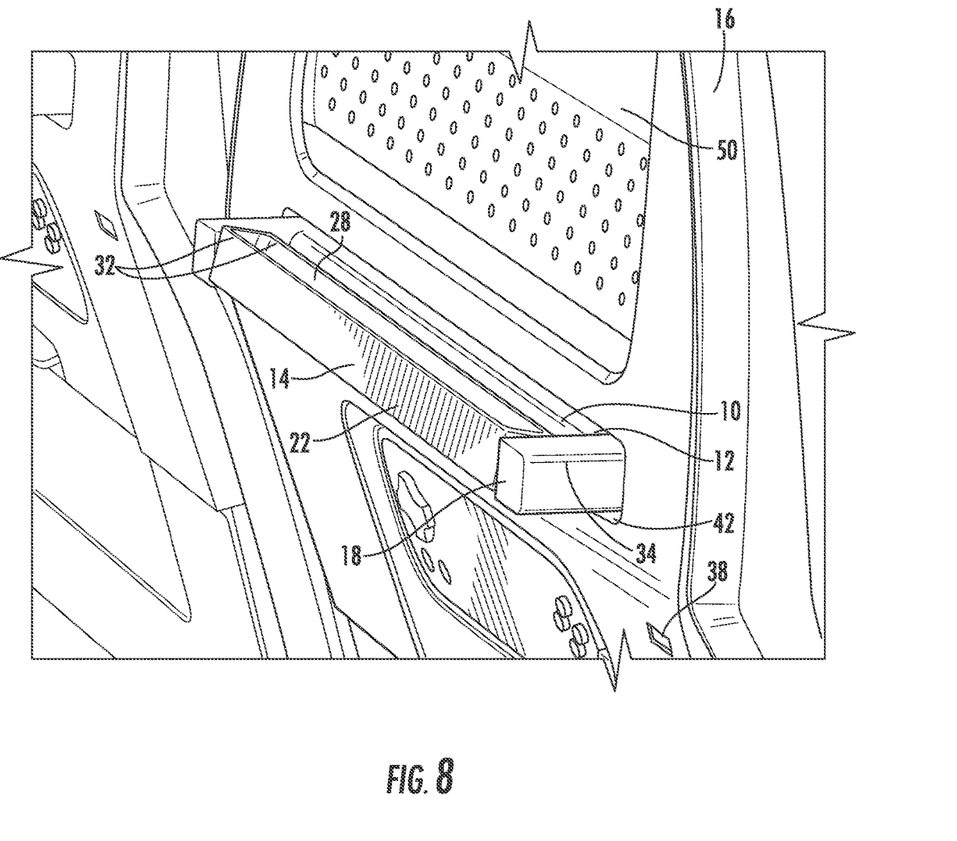
FIG. 8 is a partial perspective view of the personal electronics device mounting structure of FIG. 4 with the base in a deployed position and a cradle in a fully rotated position.

In some embodiments, the cradle 14 may be at least partially surrounded by the base 12, as shown in FIGS. 1-8. In these embodiments, the base 12 is configured to have a length that at least approximates at least one dimension (height and/or width) of the PED 26. In some embodiments, the base 12 is configured to have a length that approximates the longer dimension of the PED 26 so that the PED 26 may be inserted within the cradle 14 in a portrait or landscape orientation, as shown in FIGS. 1-8. In these embodiments, as best illustrated in FIGS. 3 and 7-8, ends 32 of each arm 22 of the cradle 14 are coupled to two projections 34 of the base 12 that extend aft along each side of the cradle 14. According to FIG. 3, the projections 34 are integrally formed with the ends 32 of each arm 22 so that the cradle 14 and the base 12 form a unitary structure. In other embodiments, as best illustrated in FIGS. 7-8, the ends 32 of each arm 22 are pivotally coupled to the projections 34 so that the cradle 14 may rotate relative to the base 12.

In other embodiments, as best illustrated in FIGS. 9-12, the cradle 14 may be located on an upper surface 36 of the base 12 where the cradle 14 is not enclosed adjacent the ends 32 of the arms 22 (i.e., there are no projections 34 coupled to the ends 32). In these embodiments, the base 12 is configured to have any suitable length that provides sufficient support for the cradle 14, and ultimately the PED 26, inserted therein. For example, the base 12 and the cradle 14 may have substantially the same length, as shown in FIGS. 9-12, or the base 12 may be longer or shorter than the cradle 14 as needed to provide a sufficient structural support for the PED 26 inserted in the cradle 14. In these embodiments, the cradle 14 may be configured to have a length that extends along a substantial portion of the shorter dimension of the PED 26. As a result, because the cradle 14 is not enclosed adjacent the ends 32 of the arms 22, the exact dimensions of the PED 26 that is inserted into the cradle 14 may vary (longer or shorter than the length of the cradle 14) so long as the cradle 14 is sufficiently long enough to stabilize the PED 26 inserted into the cradle 14.

The passenger seat back 16 may further comprise a connection port 38, shown in FIGS. 1-2, 4-6, and 8-10. The standardized design of the connection port 38 allows for a single standardized output from the electronics system, which simplifies the design and installation of the system, including but not limited to on-board entertainment ("OBE") and/or in-flight entertainment ("IFE") systems, power systems, or other suitable systems. The connection port 38 may be connected to a power supply to charge the PED 26 and/or may be connected to the OBE and/or IFE systems to transfer data between the OBE and/or IFE systems and the PED 26, or the connection port 38 may be limited to providing power supply to the PED 26 or vice versa. In these embodiments, the PED 26 may optionally be wirelessly connected to a wireless router. In these embodiments, instead of using a monitor 40 mounted on the passenger seat back 16 to interact with the OBE and/or IFE system (i.e., view movies, listen to music, play games, etc.), an application may be downloaded onto the PED 26 that allows a passenger to interact with the OBE and/or IFE systems from the PED 26.

In the embodiments where the passenger seat back 16 includes the monitor 40, as shown in FIGS. 1-3, the recess 42 may be located at a lower end 44 of a monitor bezel 46. The monitor bezel 46 is pivotally coupled to the passenger seat back 16 so that the monitor bezel 46 may be rotated to a comfortable viewing position by a user seated aft of the passenger seat back 16. For example, the monitor bezel 46 may be adjusted from an upright position (flush with the passenger seat back 16, as shown in FIGS. 1-3) to a fully rotated position (maximum amount of rotation provided by the coupling mechanism between the monitor bezel 46 and the passenger seat back 16). In certain embodiments, the monitor bezel 46 may have a range of up to approximately 15 degrees of rotation between the stowed and fully rotated positions. Because the base 12 is coupled to a lower end of the monitor bezel 46, the base 12 is provided with the same degree of rotation as is provided with the monitor bezel 46.

To use the PED mounting structure 10 in these embodiments, a user pulls the base 12 from its stowed location within the recess 42 (as shown in FIG. 1) until the base 12 reaches the deployed position (as shown in FIGS. 2-3). If the user wishes to connect the PED 26 to the connection port 38, the user may use a USB cord 48 to connect the PED 26 to the connection port 38. The user then inserts the PED 26 into the cradle 14 in a landscape orientation (longer sides arranged in a horizontal orientation) or a portrait orientation (shorter sides arranged in a horizontal orientation). One of ordinary skill in the relevant art will understand that these are but two examples of a range of suitable positions for the PED 26. The arms 22 and/or the padding 30 grip the side of the PED 26 to stabilize and hold the PED 26 within the cradle 14. To adjust the amount of rotation, the passenger accesses and rotates the monitor bezel 46 to the desired position, which simultaneously adjusts the position of the PED 26.

In other embodiments that do not include an adjustable monitor bezel 46, as shown in FIGS. 4-12, the recess 42 may be located within the passenger seat back 16. The area above the recess 42 may comprise an upper literature pocket 50 or other suitable stowage device.

Figure 4:
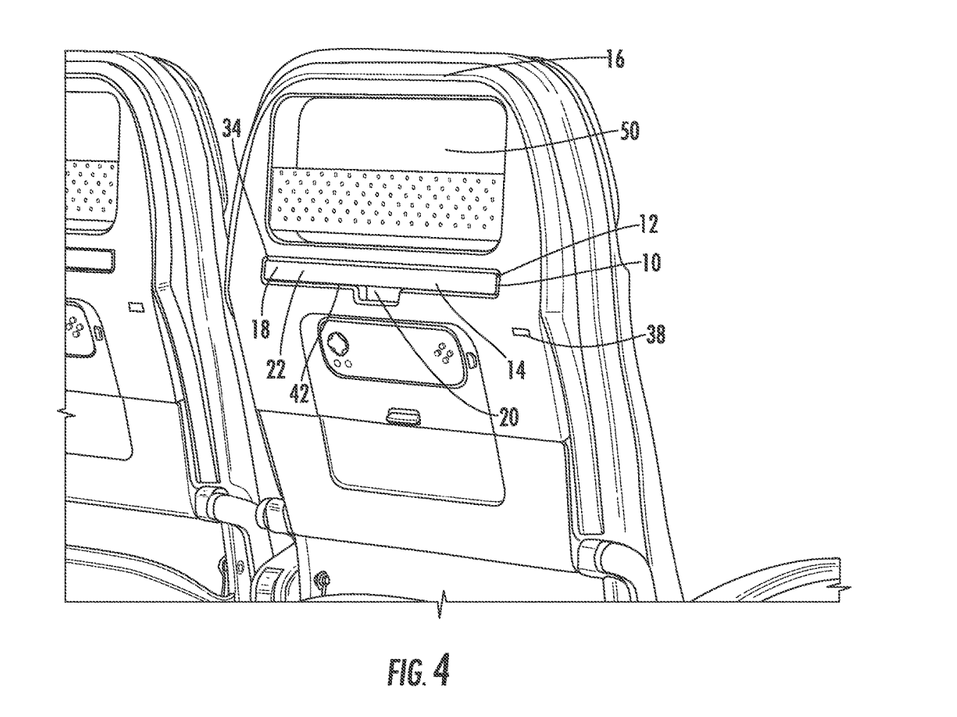
FIG. 4 is a perspective view of a personal electronics device mounting structure with a base in a stowed position and incorporated into a passenger seat back, according to certain embodiments of the present invention.
Figure 9:
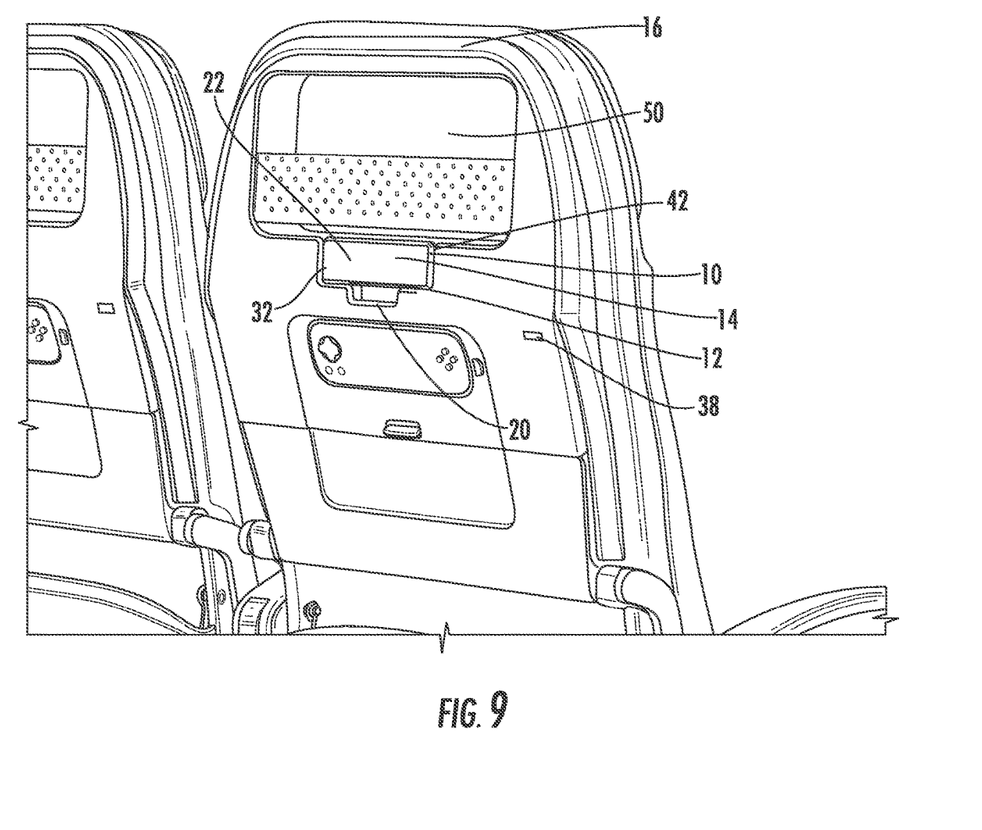
FIG. 9 is a perspective view of a personal electronics device mounting structure with a base in a stowed position and incorporated into a passenger seat back, according to certain embodiments of the present invention.
Figure 10:
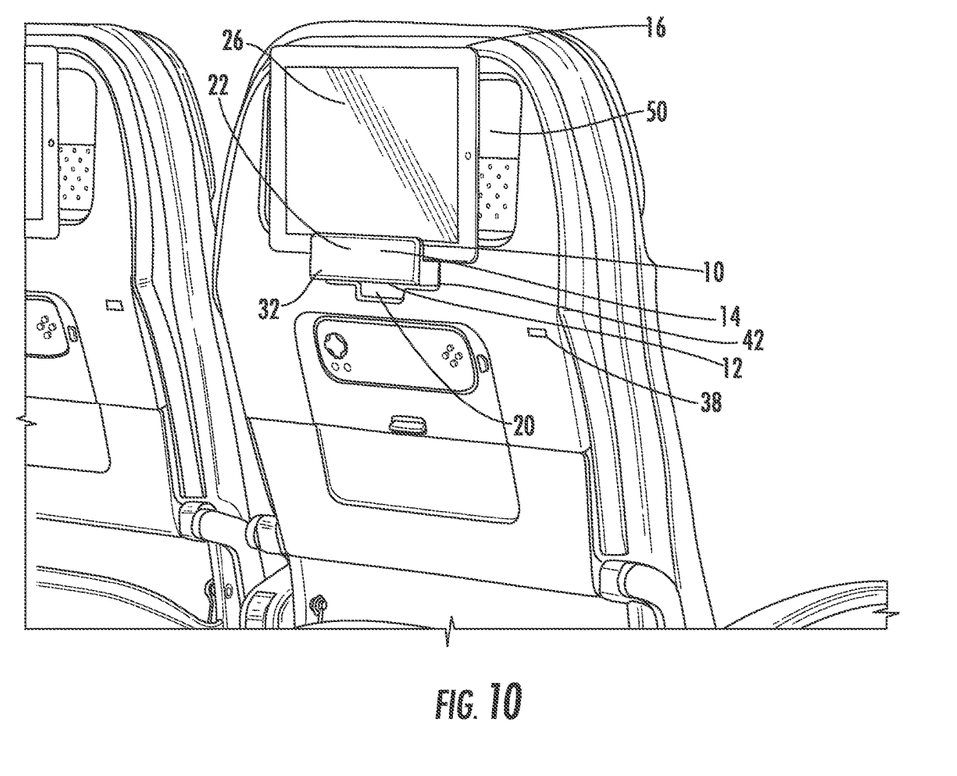
FIG. 10 is a perspective view of the personal electronics device mounting structure of FIG. 9 with the base in a deployed position and in use with a personal electronics device mounted in a landscape orientation.

To use the PED mounting structure 10 in these embodiments, a user pulls the base 12 from its stowed location within the recess 42 (as shown in FIGS. 4 and 9) until the base 12 reaches the deployed position (as shown in FIGS.

5-8 and 10-12). If the user wishes to connect the PED 26 to the connection port 38, the user may use the USB cord 48 to connect the PED 26 to the connection port 38. The user then inserts the PED 26 into the cradle 14 in a landscape orientation (longer sides arranged in a horizontal orientation) or a portrait orientation (shorter sides arranged in a horizontal orientation). One of ordinary skill in the relevant art will understand that these are but two examples of a range of suitable positions for the PED 26. The arms 22 and/or the padding 30 grip the portion of the PED 26 inserted into the cradle 14 to stabilize and hold the PED 26 within the cradle 14.

In certain embodiments, the cradle 14 may be rotated to a comfortable viewing position by a user seated aft of the passenger seat back 16. For example, because the cradle 14 is pivotally coupled to the base 12, as described above, the cradle 14 may be adjusted from an upright position (where the arms 22 are substantially aligned with the aft surface 18 of the base 12, as shown in FIGS. 4-5 and 7) to a fully rotated position (where the arms 22 are rotated forward of the aft surface 18 of the base 12 by the maximum amount of rotation provided by the coupling mechanism between the cradle 14 and the base 12, as shown in FIGS. 6 and 8). In certain embodiments, the cradle 14 may have a range of up to approximately 15 degrees of rotation between the upright and fully rotated positions. To adjust the amount of rotation, the passenger accesses and rotates the cradle 14 to the desired position, which simultaneously adjusts the position of the PED 26.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A personal electronics device mounting structure comprising:
   (a) a base comprising an aft surface, wherein the base is configured to slidingly fit within a recess so that the aft surface of the base is flush with an aft surface surrounding the recess in a stowed position, and the base is configured to linearly slide aft from the stowed position to a deployed position, wherein in the deployed position at least a first portion of the base is positioned aft of the recess and at least a second portion of the base remains positioned within the recess;
   (b) a cradle pivotally coupled to the base such that the cradle is rotatable relative to the base when the base is in the deployed position, wherein the cradle comprises a pair of arms configured to hold a personal electronics device securely in place adjacent a passenger seat back when the base is in the deployed position; and
   (c) a connection port connected to at least one of a power supply, an on-board entertainment system, or an in-flight entertainment system.

2. The personal electronics device mounting structure of claim 1, wherein the personal electronics device mounting structure is configured to provide the personal electronics device with up to 15 degrees of rotation.

3. The personal electronics device mounting structure of claim 2, wherein the cradle is rotatable up to 15 degrees relative to the base.

4. The personal electronics device mounting structure of claim 2, wherein the recess is located in a monitor bezel pivotally coupled to the passenger seat back, wherein the monitor bezel may be rotated up to 15 degrees relative to the passenger seat back.

5. The personal electronics device mounting structure of claim 1, wherein the personal electronics device is a tablet computer, a cell phone, a smart phone, a handheld video game system, a personal digital assistant, a palmtop computer, a DVD player, data or audio-video media, or a multi-media enabled device.

6. The personal electronics device mounting structure of claim 1, further comprising padding positioned on an interior surface of each of the pair of arms and configured to apply pressure to a portion of the personal electronics device inserted within the cradle.

7. The personal electronics device mounting structure of claim 6, wherein the padding is configured to form a space having trapezoidal side profile within the cradle.

8. The personal electronics device mounting structure of claim 6, wherein the padding is configured to form a space having a downwardly pointing arrow side profile within the cradle.

9. A passenger seat comprising:
   (a) a passenger seat back comprising a monitor bezel pivotally coupled to the passenger seat back, wherein the monitor bezel comprises a monitor and a recess positioned below the monitor;
   (b) a base comprising an aft surface, wherein the base is configured to slidingly fit within the recess so that the aft surface of the base is flush with an aft surface surrounding the recess in a stowed position, and the base is configured to linearly slide aft from the stowed position to a deployed position, wherein in the deployed position at least a first portion of the base is positioned aft of the recess and at least a second portion of the base remains positioned within the recess; and
   (c) a cradle coupled to the base, wherein the cradle comprises a pair of arms configured to hold a personal electronics device securely in place adjacent the monitor when the base is in the deployed position.

10. The passenger seat of claim 9, further comprising a connection port connected to at least one of a power supply, an on-board entertainment system, or an in-flight entertainment system.

11. The passenger seat of claim 9, wherein the personal electronics device is provided with up to 15 degrees of rotation via rotation of the monitor bezel relative to the passenger seat back.

12. The passenger seat of claim 9, wherein the personal electronics device is a tablet computer, a cell phone, a smart phone, a handheld video game system, a personal digital assistant, a palmtop computer, a DVD player, data or audio-video media, or a multi-media enabled device.

13. The passenger seat of claim 9, further comprising padding positioned on an interior surface of each of the pair of arms and configured to apply pressure to a portion of the personal electronics device inserted within the cradle.

14. A personal electronics device mounting structure comprising:
   (a) a base comprising an aft surface, wherein the base is configured to slidingly fit within a recess so that the aft surface of the base is flush with an aft surface surrounding the recess in a stowed position, and the base is configured to linearly slide aft from the stowed position to a deployed position, wherein in the deployed position a first portion of the base is positioned aft of the recess and a second portion of the base remains positioned within the recess;

(b) a cradle coupled to the base, wherein the cradle comprises a pair of arms coupled to a lower surface and configured to hold a personal electronics device securely in place adjacent a passenger seat back when the base is in the deployed position, and wherein ends of each arm of the cradle are pivotally coupled to projections of the base that extend aft along each side of the cradle such that the cradle is rotatable relative to the base; and (c) padding coupled to an interior surface of each of the pair of arms comprising a shape that is configured to apply pressure to a portion of the personal electronics device inserted within the cradle.

15. The personal electronics device mounting structure of claim 14, further comprising a connection port connected to at least one of a power supply, an on-board entertainment system, or an in-flight entertainment system.

16. The personal electronics device mounting structure of claim 14, wherein the cradle is rotatable up to 15 degrees relative to the base.

17. The personal electronics device mounting structure of claim 14, wherein the recess is located in a monitor bezel pivotally coupled to the passenger seat back, wherein the monitor bezel may be rotated up to 15 degrees relative to the passenger seat back.

18. The personal electronics device mounting structure of claim 14, wherein the personal electronics device is a tablet computer, a cell phone, a smart phone, a handheld video game system, a personal digital assistant, a palmtop computer, a DVD player, data or audio-video media, or a multi-media enabled device.

19. The personal electronics device mounting structure of claim 14, wherein the padding is configured to form a space having trapezoidal side profile within the cradle.

20. The personal electronics device mounting structure of claim 14, wherein the padding is configured to form a space having a downwardly pointing arrow side profile within the cradle.

* * * * *